(12) United States Patent
Kartenberg et al.

(10) Patent No.: US 11,214,211 B2
(45) Date of Patent: Jan. 4, 2022

(54) VEHICLE OCCUPANT RESTRAINT DEVICE AND METHOD FOR OPERATING A VEHICLE OCCUPANT RESTRAINT DEVICE

(71) Applicant: TRW Automotive GmbH, Alfdorf (DE)

(72) Inventors: Achim Kartenberg, Durlangen (DE); Marco Wahl, Sulzbach-Laufen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 0 days.

(21) Appl. No.: 16/632,909

(22) PCT Filed: Jul. 25, 2018

(86) PCT No.: PCT/EP2018/070130
§ 371 (c)(1),
(2) Date: Jan. 22, 2020

(87) PCT Pub. No.: WO2019/020672
PCT Pub. Date: Jan. 31, 2019

(65) Prior Publication Data
US 2020/0189505 A1    Jun. 18, 2020

(30) Foreign Application Priority Data
Jul. 26, 2017    (DE) .................... 10 2017 116 905.9

(51) Int. Cl.
*B60R 21/013*    (2006.01)
*B60N 2/04*    (2006.01)
(Continued)

(52) U.S. Cl.
CPC .............. *B60R 21/013* (2013.01); *B60N 2/04* (2013.01); *B60R 21/203* (2013.01); *B60R 22/02* (2013.01);
(Continued)

(58) Field of Classification Search
CPC .... B60N 2/0276; B60N 2/04; B60N 2/42736; B60N 2/42745; B60N 2/4279;
(Continued)

(56) References Cited

U.S. PATENT DOCUMENTS

2006/0138797 A1* 6/2006 Wang ................. B60N 2/42745
                                                    296/68.1
2018/0170215 A1* 6/2018 Yetukuri ................. B60N 2/20
(Continued)

FOREIGN PATENT DOCUMENTS

DE          4023109         1/1992
DE        102014223618      5/2016
(Continued)

*Primary Examiner* — Paul N Dickson
*Assistant Examiner* — Scott F. Underwood
(74) *Attorney, Agent, or Firm* — Tarolli, Sundheim, Covell & Tummio LLP

(57) ABSTRACT

A vehicle occupant restraint device for the protection of a vehicle occupant in a vehicle seat comprises plural restraining elements and a controller. The controller differentiates between a first situation in which the vehicle seat is in a position within the range of a standard position, and a second situation in which the vehicle seat with the vehicle occupant is in a position beyond the standard position. When the first situation is given, the controller activates a tensioning unit for tensioning a seat belt of the second restraining element and an airbag of the first restraining element. When the second situation is given, a third restraining element integrated in the vehicle seat and/or operatively connected with the vehicle seat can be activated and/or connected by the controller so that the vehicle seat is moved initially via the third restraining element to a position within the range of the standard position.

20 Claims, 1 Drawing Sheet

(51) Int. Cl.
*B60R 21/203* (2006.01)
*B60R 22/02* (2006.01)
*B60R 22/12* (2006.01)
*B60R 22/28* (2006.01)
*B60R 22/46* (2006.01)

(52) U.S. Cl.
CPC .............. *B60R 22/12* (2013.01); *B60R 22/28* (2013.01); *B60R 22/4628* (2013.01)

(58) Field of Classification Search
CPC .......... B60N 2002/0268; B60R 21/013; B60R 21/0134; B60R 21/203; B60R 2021/01034; B60R 2021/01252; B60R 2021/01272; B60R 2021/01315; B60R 22/02; B60R 22/12; B60R 22/28; B60R 22/4628
See application file for complete search history.

(56) References Cited

U.S. PATENT DOCUMENTS

2018/0281626 A1* 10/2018 Murakami ............... B60N 2/22
2019/0351794 A1* 11/2019 Huf ..................... B60N 2/42709
2020/0114867 A1* 4/2020 Ryl ........................ B60R 22/48

FOREIGN PATENT DOCUMENTS

WO 2005073033 8/2005
WO 2005100102 10/2005

* cited by examiner

VEHICLE OCCUPANT RESTRAINT DEVICE AND METHOD FOR OPERATING A VEHICLE OCCUPANT RESTRAINT DEVICE

RELATED APPLICATIONS

This application corresponds to PCT/EP2018/070130, filed Jul. 25, 2018, which claims the benefit of German Application No. 10 2017 116 905.9, filed Jul. 26, 2017, the subject matter of which are incorporated herein by reference in their entirety.

BACKAROUND OF THE INVENTION

The invention relates to a vehicle occupant restraint device according to the preamble of claim 1 and a method for operating a vehicle occupant restraint device according to the preamble of claim 15.

In automated or autonomous driving, the driver will no longer have to permanently monitor the system and, resp., the vehicle. Rather, the vehicle will independently perform functions such as indicating, changing lanes and keeping the lane. This enables the driver to adopt a position convenient to him/her in any seat adjustment within the scope of a predetermined seat adjusting field.

Moreover, new vehicle concepts allow for novel interior designs, e.g. having significantly slimmer instrument panels and new steering wheel concepts.

It is one result of the afore-described changes that the occupant protection concept of a vehicle cannot be developed, as today, to focus on particular standard positions of the vehicle seats any more, as the vehicle occupants will be provided with more degrees of freedom regarding the occupation and positions in the interior. Especially this may result in a seat position which is beyond an area of a previous standard position of the vehicle seat. As a consequence, the positions of the vehicle occupants relative to the safety systems usually tightly attached to the vehicle structure, such as seat belts and airbags, are variable during traveling and the distances may be significantly increased depending on the situation as compared to the range of the standard position.

Known solutions are, for example, airbags having enlarged volumes, larger covering areas, larger or multi-stage inflators, adaptations by vents which may be designed to be switchable, or variable shapes by tear seams or switched tethers, where appropriate. In addition, in the field of the seat belts, seat-integrated seat belt systems are known already.

However, an enlargement in the inflatable airbag systems is limited by various factors. For example, enlarged airbag volumes and, resp., active areas take longer periods of time to reach the efficient position of the airbags. Larger and/or faster inflators are not adapted to optionally compensate for this, either, without lastingly changing the effect of the airbag. Thus, an airbag deploying more quickly and at a higher mass flow rate can act "more aggressively" vis-à-vis the vehicle occupant in a so-called "out-of-position" test and therefore may not stand the test.

Although the already known seat-integrated seat belt systems already offer advantages in this respect, however even by said systems large distances still have to be overcome to achieve a safe restraining effect of the inflatable restraint systems. In particular, for a large forward movement of the vehicle occupant in a situation of restraint, the known load limiters would have to permit large relative movements between the vehicle seat and the vehicle occupant which may negatively affect the occupant protection.

SUMMARY OF THE INVENTION

It is the object of the invention to provide an occupant protection system, especially a vehicle occupant restraint device which achieves sufficient protective effect irrespective of a position of the vehicle seat and the vehicle occupant. It is especially the object of the invention to provide an occupant restraint system which minimizes a movement of the vehicle occupant relative to the vehicle seat and enables the vehicle occupant to be safely delivered to safety systems tightly integrated in the vehicle. In addition, it is the object of the invention to provide a method for operating such occupant protection system.

Achieving the Object

The features according to claim 1 and claim 15 result in achieving the object. Advantageous configurations are described in the subclaims.

A vehicle occupant restraint system according to the invention serves for the protection of a vehicle occupant in a vehicle seat. The vehicle occupant restraint device comprises a controller and plural restraining elements.

A first restraining element comprises an airbag module having an airbag. After activation of the airbag module in a situation of restraint, the airbag can be filled with gas and inflated via an inflator to restrict a forward movement of the vehicle occupant toward the instrument panel. In typical embodiments, the airbag module of the first restraining element is arranged in the steering wheel and/or in the instrument panel.

A second restraining element comprises a seat belt system including a seat belt, a belt retractor and at least one tensioning unit. The seat belt system is especially a seat belt system integrated in the vehicle seat. The seat belt of the second restraining element is operatively connected with the tensioning unit. In a typical embodiment, the tensioning unit comprises at least one main tensioner or one pre-tensioner and at least one main tensioner.

The pre-tensioner may be a tensioning unit driven by an electric motor, for example, which acts on the belt reel and enables the seat belt to be preferably reversibly tensioned. The main tensioner may especially be a pyrotechnic tensioning unit. Such main tensioner may be operatively connected with each of the belt reel, the belt buckle or an end fitting of the seat belt system. In various embodiments, the second restraining element may include a main tensioner for the belt retractor and/or the belt buckle and/or the end fitting.

Further, the vehicle occupant restraint device according to the invention comprises a third restraining element. The third restraining element is integrated in the vehicle seat and/or is operatively connected with the vehicle seat. The third restraining element is especially used to move the vehicle seat with the vehicle occupant in a situation of restraint to a position that is within the range of the standard position so that the further restraining elements can develop an optimum protective effect, where appropriate.

In accordance with the invention, in a situation of restraint the third restraining element may help to realize at least partially the load limitation and the forward movement of the vehicle occupant via the vehicle seat. In particular, the third restraining element enables the vehicle seat including the vehicle occupant to move forward passively or actively via the third restraining element and/or the back rest of the vehicle seat to move passively or actively to a more upright position via the third restraining element.

The controller of the vehicle occupant restraint device according to the invention includes at least one sensor element. The sensor element in a preferred embodiment comprises at least one sensor via which a position of the vehicle seat can be determined. Preferably, plural sensor elements and/or sensors are provided so that the controller can determine an exact position of the vehicle seat via the data of the sensor elements. Especially an inclination of the back rest of the vehicle seat as well as a position of the seat of the vehicle seat should be measurable and, resp., determinable by the at least one sensor element.

In a situation of restraint, the controller may help to control and activate by determining the position of the vehicle seat, depending on the vehicle seat position, preferably specifically the individual restraining elements of the vehicle occupant restraint device.

For this purpose, the controller discriminates especially two different situations which may occur before/during a situation of restraint. The first situation is given when the vehicle seat with the vehicle occupant is in a position within the range of a standard position relative to the airbag of the first restraining element. The second situation is given when the vehicle seat with the vehicle occupant is beyond a position within the range of the standard position relative to the airbag of the first restraining element. The standard position here especially describes a position or an area of the vehicle seat in a non-automated driving situation. That is to say, by the standard position a seat position defined for tests is described in which e.g. the vehicle occupant on the driver seat himself/herself is steering the vehicle. In the first situation, the distance of the vehicle occupant from the airbag of the first restraining element thus usually corresponds to a distance at which an optimum restraining effect for the vehicle occupant can be achieved by the airbag.

When the first situation is given, only the first and second restraining elements are activated by the control unit. For this purpose, at least the airbag module of the first restraining element and the tensioning unit of the second restraining element are activated by the controller. By activation of the airbag module the inflator is ignited and the airbag is filled. Activation of the tensioning unit causes to be additionally tensioned. In further embodiments, the second restraining element may further comprise one or more load limiters. The load limiters are preferably integrated in the belt retractor and are connected or not deactivated or, resp., disconnected by the controller, if the first situation is determined.

When the second situation is given, initially the third restraining element integrated in the vehicle seat and/or operatively connected with the vehicle seat is activated and/or connected by the controller. The third restraining element helps to move the vehicle seat with the vehicle occupant to a position within the range of the standard position. The control pulse for filling the airbag of the first restraining element is given by the controller only upon reaching or shortly before reaching the standard position. Accordingly, the point in time is fixed so that an optimum restraining effect can be achieved by the airbag when the vehicle occupant is impacting.

In an especially preferred embodiment, when the second situation is given, the vehicle occupant is additionally actively fixed by the seat belt in the vehicle seat. To this end, the controller activates the tensioning unit of the second restraining element so that the seat belt is tensioned by the tensioning unit and the vehicle occupant is fixed sufficiently tightly in the vehicle seat. In this way, the vehicle seat and the vehicle occupant are moving together and the forward movement and the load limitation can be realized by the vehicle seat.

In order to effectuate the change of position in a situation of restraint, the third restraining element comprises at least one displacing element. In a preferred embodiment, the third restraining element comprises a linear displacing element and/or a rotational displacing element.

The linear displacing element can especially help to realize a forward movement of the vehicle seat in the longitudinal vehicle direction. The rotational displacing element can help to realize especially a rotation or movement of the back rest to an upright position. In a situation of restraint, via the linear and/or rotational displacing element(s) thus at least partially the load limitation and the forward movement of the vehicle occupant can be realized via the vehicle seat. The third restraining element may be a passively and/or actively acting element. An actively acting element may be a displacing element, for example, which moves the vehicle seat to the standard position via motors or pyrotechnically ignited elements. Such an actively controllable third restraining element may help to move the vehicle seat e.g. by the controller already immediately before an imminent collision and a related situation of restraint to a position within the range of the standard position. The information for such precautionary activation of the third restraining element is preferably provided to the controller by the vehicle control.

Alternatively, such actively controllable third restraining element can be activated by the controller directly after the occurrence of damage releasing the situation of restraint, as this is the case in restraining elements in prior art vehicles.

A passively acting element, on the other hand, is a displacing element, for example, which permits a change of position of the vehicle seat, if a load acting on the passively acting displacing element is exceeded. The passively acting third restraining element may be designed so that it can be activated and/or deactivated by the controller. Alternatively, the third restraining element may be designed so that it is automatically connected beyond a standard position.

The third restraining element, especially the displacing element, may comprise a load limiter, for example. The load limiter is designed so that, upon activation or connection by the controller, it permits a change of position of the vehicle seat. The third restraining element, especially the linear and/or rotational displacing element, may comprise e.g. a torsion rod or an energy-absorbing structure for this purpose.

Via the load limiters the velocity and the acceleration of the vehicle seat, for example, can be determined and limited upon the change of position.

The energy-absorbing structure may comprise, for instance, a corrugated element which is arranged between two deforming elements. On the outer faces directed toward each other between which the corrugated element is arranged, the deforming elements have a sinusoidal contour, for example, by which the corrugated element is subjected to continuous deformation when the seat is moved forward and/or the back rest is rotated and thus energy is absorbed.

Especially the load limiter of the third restraining element may be provided to be automatically connected in a situation of restraint, if the vehicle seat is in a standard position. Alternatively, the load limiter may be actively connected via the controller. For example, the load limiter may be provided to be connectable via a pyrotechnically ignited actuating mechanism.

In one embodiment, the second restraining element, especially the belt retractor of the second restraining element, may comprise a connectable load limiter. Connecting and/or disconnecting of the load limiter can preferably be controlled via the controller. The load limiter of the second restraining element substantially corresponds to a belt load limiter known from the state of the art and permits the seat belt to be extended from the belt retractor, if the vehicle seat is within the range of the standard position or as soon as the vehicle seat is within the range of the standard position. The controllable connection or disconnection of the load limiter of the second restraining element may help to fix the vehicle occupant in the standard position to the vehicle seat during movement of the vehicle seat. In this way, an excessive forward movement of the vehicle occupant while the vehicle seat is moved to the standard position can be prevented or at least restricted.

The vehicle occupant restraint device may alternatively comprise further restraining elements. In particular, the further restraining elements may comprise airbag modules such as side airbag modules, interactive airbag modules and/or knee airbag modules.

The present invention is also intended to protect an autonomously drivable vehicle that includes a vehicle occupant restraint device according to the invention.

The method for operating a vehicle occupant restraint device according to the invention which comprises a controller and a group of at least three matching restraining elements, wherein a first restraining element comprises an airbag module including an airbag and a second restraining element comprises a seat belt system including a seat belt, a tensioning unit and a belt retractor, comprises the following steps:

in a situation of restraint, the controller differentiates between a first situation in which the vehicle seat with the vehicle occupant is in a position within the range of a standard position relative to the airbag of the first restraining element and a second situation in which the vehicle seat with the vehicle occupant is in a position beyond the standard position;

when the first situation is given, the controller activates the tensioning unit of the seat belt of the second restraining element as well as the airbag module of the first restraining element;

when the second situation is given, the controller initially activates a third restraining element only so that the vehicle seat with the vehicle occupant is moved to a position within the range of the standard position, as well as the tensioning unit of the second restraining element so that the vehicle occupant is fixed by the seat belt of the second restraining element during the movement of the vehicle seat to the position within the range of the standard position in the vehicle seat.

Concerning the advantages of the method according to the invention, the respective remarks on the vehicle occupant restraint device according to the invention can be referred to.

In one embodiment, when the first situation is given, the load limiter is connected in the belt retractor of the second restraining element by the controller. When the second situation is given, the load limiter is connected in the belt retractor of the second restraining element by the controller only when the vehicle seat is in a position within the range of the standard position. As an alternative, when the second situation is given, the load limiter is disconnected in the belt retractor of the second restraining element by the controller and/or uncoupled from the belt retractor, until the vehicle seat is in a position within the range of the standard position.

For enabling the controller to differentiate between the two situations, viz. whether the vehicle seat is in within the range of the standard position or in a position beyond the range of the standard position, it turns out to be advantageous that the controller detects the location and position of the vehicle seat by means of sensor elements. The detection should be continuous so that always the current location and position of the vehicle seat is known.

BRIEF DESCRIPTION OF THE DRAWINGS

Further advantages, features and details of the invention will be evident from the following description of an example embodiment which is meant to be not limiting as well as by way of the drawings, wherein.

DESCRIPTION

Figure 1:
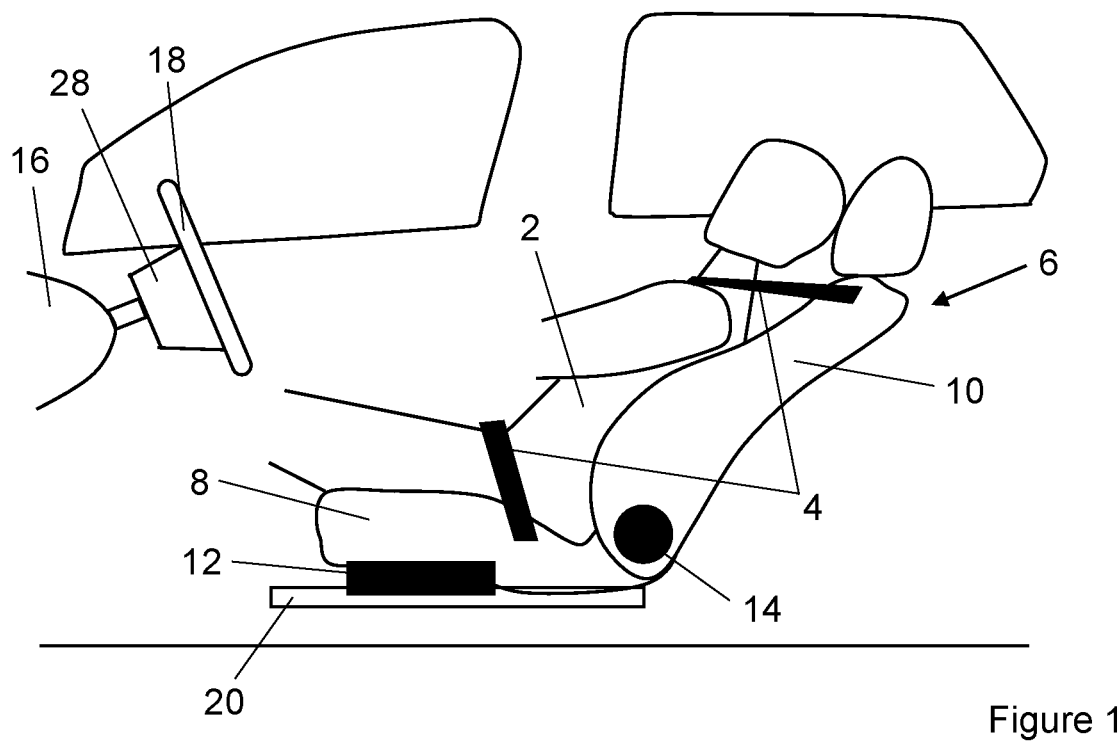
FIG. 1 shows a schematic side view of an area of a driver vehicle seat including a vehicle occupant restraint device according to the invention prior to a situation of restraint.

In FIG. 1, a vehicle occupant 2 is shown in a vehicle seat 6 of the driver side of a vehicle. The vehicle seat 6 is adjusted by the vehicle occupant 2 to an approximately reclined position, i.e. the back rest 10 of the vehicle seat is rotated to the rear. In addition, the vehicle seat 6 is displaced to the rear via the seat rails 20 in the longitudinal vehicle direction away from the steering wheel 18 and the instrument panel 16. The position of the illustrated vehicle seat 6 corresponds to a position which can be adopted during an autonomous/automated driving phase of the vehicle.

The vehicle seat 6 shown in FIG. 1 is in a position which is located beyond the range of a standard position. The standard position of the vehicle seat 6 defines range within which the seat belt system including the seat belt 4 of a second restraining element is matched with a deployed airbag (22) (FIG. 2) of the airbag module 28 of a first restraining element such that the protective effect for the vehicle occupant is most optimal.

FIG. 1 moreover illustrates a linear displacing element 12 and a rotational displacing element 16 of a third restraining element of the vehicle occupant restraint device.

Figure 2:
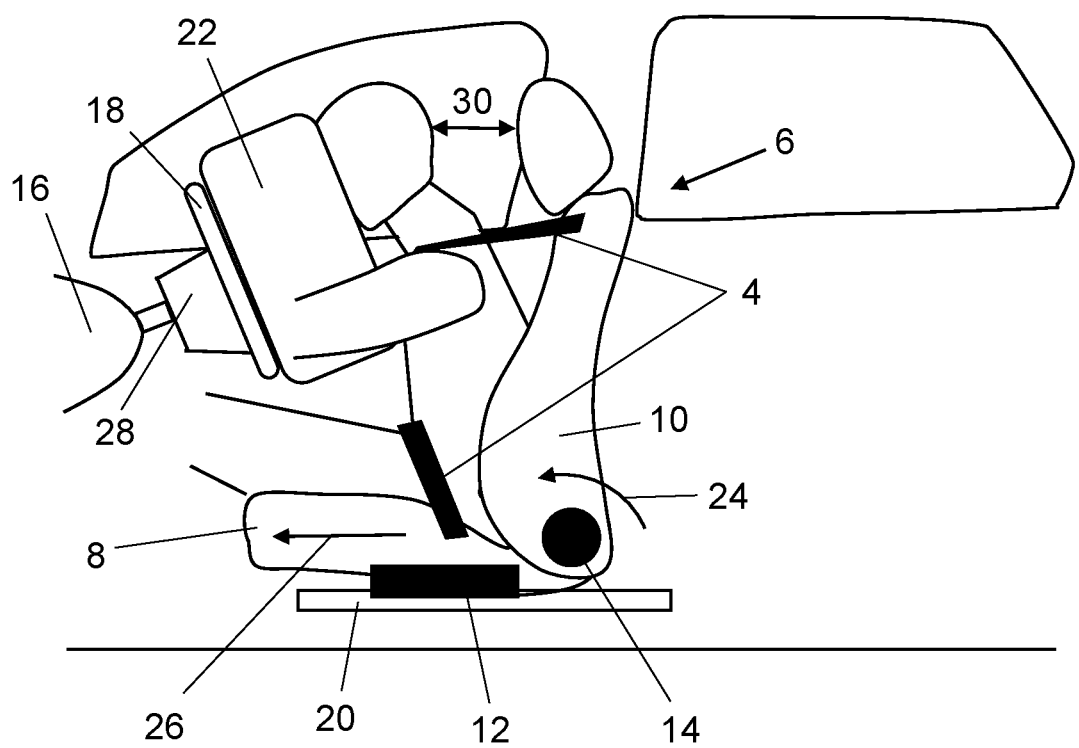
FIG. 2 shows a schematic side view of an area of a driver vehicle seat including a vehicle occupant restraint device according to the invention during a situation of restraint.

In FIG. 2, a situation immediately following a collision of the vehicle is shown in which the vehicle occupant 2 impacts on the airbag 22 of the airbag module 28 of the first restraining element.

In order to achieve most efficient restraint of the vehicle occupant, the vehicle seat 6 has been moved via the linear displacing element 12 and the rotational displacing element 16 initially to the shown position.

In order to be able to determine the position of the vehicle seat 6, the controller of the vehicle occupant restraint device comprises sensor elements (not shown). The sensor elements may be arranged, for example, in the seat rails 20, the seat 8 and/or the back rest. Of preference, the seat position is continuously monitored by the controller.

If the controller determines immediately before or, resp., at the beginning of a situation of restraint a position of the vehicle seat which is within the range of the standard position, the seat belt 4 is tensioned via a tensioning unit (not shown) of the seat belt system of the second restraining element. In addition, the airbag 22 is filled via an inflator of the airbag module 28. The effect and the function of the vehicle occupant restraint device in said first situation substantially corresponds to the effect and the function of an occupant protection system known from the state of the art comprising a seat belt system and an airbag module.

If the controller determines immediately before or, resp., at the beginning of a situation of restraint a position of the vehicle seat as shown in FIG. 1, the tensioning unit of the second restraining element is activated. In this way, the vehicle occupant 2 is tightly fixed on the vehicle seat 6 by the seat belt 4. In addition, the linear displacing element 12 and the rotational displacing element 16 of the third restraining element are activated or connected by the controller.

The linear displacing element 12 and the rotational displacing element 16 cause the vehicle seat with the vehicle occupant 2 to move to the range of the standard position of the vehicle seat. Thus, the forward movement of the vehicle occupant is initially realized by the vehicle seat 6 in which the vehicle occupant 2 is held and, resp., fixed via the seat belt 4. The load limitation via which both the movement in the displacing direction 26 of the entire vehicle seat 6 and the rotation of the back rest 10 in the direction of rotation 24 can be adjusted and fixed is defined via load limiters. The load limiters may be comprised, for example, as an energy-absorbing structure or as a torsion rod in the linear displacing element 12 and/or the rotational displacing element 16.

The controller activates the airbag module 28 as soon as or immediately before the vehicle seat 6 reaches a position within the range of the standard position. The point in time of activation is defined such that the airbag 22 produces a most optimal restraining effect.

Via a load limiter of the second restraining element which is operatively connected to the seat belt 4, the seat belt system can provide the vehicle occupant with even further forward movement path 30. In this way, "gentler" delivery of the vehicle occupant 6 from the seat belt system of the second restraining element to the airbag 22 of the first restraining system can be achieved. The load limiter of the second restraining element can preferably be connected or disconnected by the controller.

The invention claimed is:

1. A vehicle occupant restraint device for the protection of a vehicle occupant (2) in a vehicle seat (6) comprising plural restraining elements and a controller, wherein at least one first restraining element comprises an airbag module (28) including an airbag (22) and at least one second restraining element comprises a seat belt (4) having a belt retractor, the seat belt (4) being operatively connected with a tensioning unit, wherein the controller includes at least one sensor element for determining the position of the vehicle seat (6) so that, in a situation of restraint, the controller differentiates between a first situation in which the vehicle seat (6) with the vehicle occupant (2) is in a position within the range of a standard position relative to the airbag (22) of the first restraining element and a second situation in which the vehicle seat (6) with the vehicle occupant (2) is in a position beyond the standard position, and, when the first situation is given, the controller only activates the tensioning unit for tensioning the seat belt (4) of the second restraining element and the airbag (22) of the first restraining element, whereas, when the second situation is given, the controller first activates the tensioning unit of the second restraining element to tension a shoulder portion of the seat belt (4) against the vehicle occupant's torso, and then activates and/or connects a third restraining element which is integrated in the vehicle seat (6) and/or is operatively connected with the vehicle seat (6) so that the vehicle seat (6) is moved via the third restraining element to the position within the range of the standard position with the vehicle occupant's torso tightly fixed thereto.

2. The vehicle occupant restraint device according to claim 1, wherein the third restraining element comprises a linear displacing element (12) and/or a rotational displacing element (14).

3. The vehicle occupant restraint device according to claim 1, wherein the third restraining element comprises a load limiter.

4. The vehicle occupant restraint device according to claim 1, wherein the third restraining element comprises an energy-absorbing structure.

5. The vehicle occupant restraint device according to claim 1, wherein the third restraining element comprises a torsion rod.

6. The vehicle occupant restraint system according to claim 1, wherein a change of position of the vehicle seat (6) caused by the third restraining element can be actively controlled.

7. The vehicle occupant restraint system according to claim 6, wherein, when a risk of an imminent situation of restraint is detected, the controller moves the vehicle seat (6) to the position within the range of the standard position.

8. The vehicle occupant restraint device according to claim 1, wherein the tensioning unit of the second restraining element comprises at least one main tensioner.

9. The vehicle occupant restraint device according to claim 1, wherein the tensioning unit of the second restraining element comprises a pre-tensioner.

10. The vehicle occupant restraint device according to claim 1, wherein the belt retractor of the second restraining element comprises a connectable load limiter, with a connection and/or disconnection of the load limiter being controllable by the controller.

11. The vehicle occupant restraint device according to claim 1, wherein the second restraining element is a seat-integrated seat belt system.

12. The vehicle occupant restraint device according to claim 1, wherein the airbag module (28) of the first restraining element is disposed in a steering wheel (18) and/or a instrument panel (16).

13. The vehicle occupant restraint device according to claim 1, including further restraining elements.

14. An autonomously drivable vehicle, including a vehicle occupant restraint device according to claim 1.

15. The vehicle occupant restraint device according to claim 1, wherein when the second situation is given, the controller activates the airbag (22) of the first restraining element after the vehicle seat (6) is moved via the third restraining element to the position within the range of the standard position.

16. A method for operating a vehicle occupant restraint device for the protection of a vehicle occupant (2) in a vehicle seat (6) comprising a controller and a group of at least three restraining elements, a first restraining element comprising an airbag module (28) including an airbag (22) and a second restraining element comprising a seat belt system including a seat belt (43), a tensioning unit and a belt retractor, wherein the method comprises the following steps:

in a situation of restraint, the controller differentiates between a first situation in which the vehicle seat (6) with the vehicle occupant (2) is in a position within the range of a standard position relative to the airbag (22) of the first restraining element, and a second situation in which the vehicle seat (6) with the vehicle occupant (2) is in a position beyond the standard position;

when the first situation is given, the controller activates the tensioning unit of the seat belt (4) of the second restraining element as well as the airbag module (28) of the first restraining element;

when the second situation is given, the controller first activates the tensioning unit of the second restraining element to tension a shoulder portion of the seat belt (4) against the vehicle occupant's torso, and then activates a third restraining element so that the vehicle seat (6) with the vehicle occupant is moved via the third restraining element to the position within the range of the standard position with the vehicle occupant's torso tightly fixed thereto.

17. The method according to claim 16, wherein the controller detects the position of the vehicle seat (6) by means of at least one sensor element.

18. The method according to claim 16, wherein, when the first situation is given, the controller connects a load limiter inside the belt retractor of the second restraining element.

19. The method according to claim 16, wherein, when the second situation is given, the controller connects a load limiter within the belt retractor of the second restraining element only when the vehicle seat (6) is in the position within the range of the standard position or disconnects the load limiter within the belt retractor of the second restraining element and/or uncouples the load limiter from the belt retractor, until the vehicle seat (6) is in the position within the range of the standard position.

20. The method according to claim 16, wherein when the second situation is given, the controller activates the airbag module (28) of the first restraining element after the vehicle seat (6) is moved via the third restraining element to the position within the range of the standard position.

* * * * *